(12) United States Patent
Sedlarikova et al.

(10) Patent No.: US 11,824,191 B2
(45) Date of Patent: Nov. 21, 2023

(54) ALKALI AND/OR ALKALINE EARTH ION-SULFUR BATTERY

(71) Applicants: BRNO UNIVERSITY OF TECHNOLOGY, Brno (CZ); MORROW TECHNOLOGIES AS, Arendal (NO)

(72) Inventors: Marie Sedlarikova, Brno (CZ); Tomas Kazda, Brno (CZ); Marek Slavik, Sered (SK); Andrea Strakova Fedorkova, Kosice (SK)

(73) Assignees: BRNO UNIVERSITY OF TECHNOLOGY, Brno (CZ); MORROW TECHNOLOGIES AS, Arendal (NO)

( * ) Notice: Subject to any disclaimer, the term of this patent is extended or adjusted under 35 U.S.C. 154(b) by 242 days.

(21) Appl. No.: 17/047,770

(22) PCT Filed: Apr. 15, 2019

(86) PCT No.: PCT/EP2019/059708
§ 371 (c)(1),
(2) Date: Oct. 15, 2020

(87) PCT Pub. No.: WO2019/201876
PCT Pub. Date: Oct. 24, 2019

(65) Prior Publication Data
US 2021/0111401 A1    Apr. 15, 2021

(30) Foreign Application Priority Data

Apr. 18, 2018  (EP) .................................. 18168103

(51) Int. Cl.
*H01M 4/38*     (2006.01)
*H01M 4/04*     (2006.01)
(Continued)

(52) U.S. Cl.
CPC ........... *H01M 4/38* (2013.01); *H01M 4/0404* (2013.01); *H01M 4/0416* (2013.01);
(Continued)

(58) Field of Classification Search
CPC .... H01M 4/38; H01M 4/0404; H01M 4/0416; H01M 4/0471; H01M 4/139;
(Continued)

(56) References Cited

U.S. PATENT DOCUMENTS

2005/0220989 A1 * 10/2005 Chaturvedi ........... H01M 4/886
427/427
2006/0083986 A1 *  4/2006 Li ......................... H01M 4/387
429/101

(Continued)

FOREIGN PATENT DOCUMENTS

CN      105489901 A       4/2016
CN      107221459 A   *   9/2017
(Continued)

OTHER PUBLICATIONS

Moon, S., Jung, Y.H., Jung, W.K., Jung, D.S., Choi, J.W. and Kim, D.K. (2013), Encapsulated Monoclinic Sulfur for Stable Cycling of Li-S Rechargeable Batteries. Adv. Mater., 25: 6547-6553. (Year: 2013).*

(Continued)

*Primary Examiner* — Brian R OHara
*Assistant Examiner* — Emily Elizabeth Freeman
(74) *Attorney, Agent, or Firm* — Notaro, Michalos & Zaccaria P.C.

(57) ABSTRACT

An alkali- and/or alkaline earth-ion sulfur battery having at least one cathode containing a cathode current collector foil, optionally a conductive adhesive interlayer, a primary cathode mass layer containing a conductive dimensionally stable porous host structure, sulfur as an active material, preferably (Continued)

at least 20% of the sulfur present is monoclinic sulfur allotrope, and optionally conductive additives, binders and pore-forming additives; a secondary cathode mass layer containing sulfur and alkali-ion- and/or alkaline earth-ion-intercalating material, optionally a layer containing graphene oxide and/or reduced graphene oxide, heteroatom Group VIIa and/or Group Va elements co-doped graphene, and a Group VIIa and/or Group Va heteroatom-containing polymer; at least one anode and at least one separator. The resulting cells offer a wide range of economic and ecological advantages over the currently available cells, as well as allowing versatility of materials and production processes.

24 Claims, 4 Drawing Sheets (51) Int. Cl.
H01M 4/139 (2010.01)
H01M 4/36 (2006.01)
H01M 4/80 (2006.01)
H01M 10/052 (2010.01)
H01M 10/054 (2010.01)

(52) U.S. Cl.
CPC ......... H01M 4/0471 (2013.01); H01M 4/139 (2013.01); H01M 4/364 (2013.01); H01M 4/808 (2013.01); H01M 10/052 (2013.01); H01M 10/054 (2013.01)

(58) Field of Classification Search
CPC .... H01M 4/364; H01M 4/808; H01M 10/052; H01M 10/054
See application file for complete search history.

(56) References Cited

U.S. PATENT DOCUMENTS

| | | | |
|---|---|---|---|
| 2009/0117461 A1* | 5/2009 | Shembel | H01M 4/0411 429/231.95 |
| 2010/0075225 A1* | 3/2010 | Wilkins | H01M 4/621 429/212 |
| 2012/0164561 A1* | 6/2012 | Yadav | B82Y 30/00 427/126.3 |
| 2013/0288134 A1* | 10/2013 | Hama | H01M 10/052 429/322 |
| 2014/0147710 A1* | 5/2014 | Schaefer | H01M 50/457 429/246 |
| 2017/0023513 A1* | 1/2017 | Conte | H01G 11/48 |
| 2017/0162876 A1* | 6/2017 | Zhou | H01M 4/625 |
| 2018/0083266 A1* | 3/2018 | Zhamu | H01M 4/808 |
| 2018/0159131 A1* | 6/2018 | Seol | H01M 4/622 |
| 2018/0175375 A1* | 6/2018 | Lecuyer | H01M 4/622 |
| 2021/0098778 A1* | 4/2021 | He | H01M 4/364 |

FOREIGN PATENT DOCUMENTS

| | | |
|---|---|---|
| WO | 2013159471 A1 | 10/2013 |
| WO | 2014118547 A1 | 8/2014 |
| WO | 2017193778 A1 | 11/2017 |

OTHER PUBLICATIONS

International Search Report and Written Opinion for corresponding PCT application No. PCT/EP2019/059708, dated Jun. 9, 2019.

* cited by examiner

ALKALI AND/OR ALKALINE EARTH ION-SULFUR BATTERY

FIELD OF THE ART

The present invention relates to alkali and/or alkaline earth ion-sulfur battery.

BACKGROUND ART

Battery systems are widespread and used in many appliances. There is an ongoing push on improving the stability, capacity and reliability of batteries, while minimizing their size which in turn allows to minimize the battery-powered appliances.

Alkali and/or alkaline earth ion-sulfur batteries are subject to research and development in the last decade. Most common type thereof is lithium-sulfur battery.

A typical lithium-sulfur cell comprises a sulfur cathode (positive electrode), an anode (negative electrode) preferably made of lithium metal, and a separator soaked with liquid $Li^+$ conductive electrolyte. The process for making cathode slurry consists from grinding and mixing electroactive sulfur, conductive additives, binders, solvents and other additives needed to further improve desired cathode parameters. The slurry is then applied by roll coating to a current collector foil, dried to remove the solvent and subsequently calendered to form a composite electrode, which is cut into the desired shape to form a cathode. A polymer separator soaked with electrolyte is placed between the cathode and the anode. Total solid contents in anode and cathode slurries are between 50-70 wt. % for a standard formulation while the amount of binder is in the range of 5-20 wt. %. Higher concentrations of the binder may improve the electrode adhesion properties but due to the dead volume/weight of such materials it further deteriorates the performance of the whole battery. Both electrodes are normally prepared from viscous slurries in order to facilitate roll-to-roll coating-drying-calendering operations. A thorough mixing of the slurries is critical for the coating and drying operations, which will eventually affect the performance and quality of the batteries.

Currently, one drawback of the lithium-sulfur batteries is a large change in cathode volume while the cathode absorbs lithium during discharging of the battery, thus resulting in undesirable mechanical stresses and rapid degradation of the battery (especially of the cathode itself).

Another drawback are unwanted reactions and dissolution of the intermediate polysulfides in the course of discharging and charging with the electrolytes, resulting in irreversible loss of active sulfur.

The present invention aims at overcoming the drawbacks of the current state of the art.

DISCLOSURE OF THE INVENTION

Object of the present invention is an alkali- and/or alkaline earth-ion-sulfur battery, and methods of preparation of its cathode and anode which form part of the manufacturing process for the battery.

In a first aspect, the present invention provides an alkali- and/or alkaline earth-ion-sulfur battery comprising
  at least one cathode containing:
    a cathode current collector foil;
    optionally a conductive adhesive interlayer placed between the cathode current collector foil and a primary cathode mass layer;
    a primary cathode mass layer, containing a conductive dimensionally stable porous host structure, sulfur as an active material, wherein preferably at least 20% of the sulfur present is monoclinic sulfur allotrope, and optionally conductive additives, binders and pore-forming additives;
    a secondary cathode mass layer, containing sulfur and alkali-ion- and/or alkaline earth-ion-insertion, alloying or intercalating material;
    optionally a layer containing graphene oxide and/or reduced graphene oxide, heteroatom Group VIIa and/or Group Va elements co-doped graphene, and a Group VIIa and/or Group Va heteroatom-containing polymer;
  at least one anode, and
  at least one separator.

In a preferred embodiment, the at least one anode contains:
  an anode current collector foil;
  optionally a conductive adhesive interlayer placed between the anode current collector foil and a primary anode mass layer;
  a primary anode mass layer, containing a conductive dimensionally stable porous host structure, a metal capable of forming intermetallic alloys with an alkali metal and/or an alkaline earth metal, and optionally conductive additives, binders and pore-forming additives;
  optionally a secondary anode mass layer, containing graphene oxide and/or reduced graphene oxide, heteroatom Group VIa elements co-doped graphene, and a polymer, preferably an elastomeric polymer;
  an alkali metal and/or an alkaline earth metal, preferably in the form of foil or powder.

The cathode and the anode as described herein are preferably layered electrodes, more preferably stacked electrodes.

The dimensionally stable porous host structure is a porous material that maintains its outer dimensions—length, width, depth—(hence "dimensionally stable") regardless of the volume change of the active mass sulfur contained in this porous material. The dimensionally stable porous host structures may be rigid or flexible, but still maintaining the outer dimensions. The use of this porous host structure (material) for containing at least part of the sulfur active material decreases or even prevents the volume change of the cathode during the charging and discharging process.

The dimensionally stable conductive porous host structure may be selected from carbon foam, preferably a flexible porous carbon foam, such as carbonized organic and/or polymeric foam, electroless plated organic and/or polymeric foam (e.g., by metal, such as nickel), graphene coated carbon foam; $MnO_2$ foam, or $MnO_2$-coated carbon foam, preferably the conductive porous host structure is self-supporting. The starting porous host structure (before incorporation of sulfur, binders, additives, etc.) may have open type porosity≥98%. After the incorporation of sulfur, binders, additives, etc., the porous host structure composite may have porosity of 40 to 70%.

The alkali metal ions are monovalent ions of metals of the IA group of the periodic table which include $Li^+$, $Na^+$, $K^+$, $Rb^+$, $Cs^+$, preferably $Li^+$. The alkaline earth metal ions are divalent ions of metals of the IIA group of the periodic table which include preferably $Mg^{2+}$, $Ca^{2+}$. The alkali metals and the alkaline earth metals are the metals corresponding to said ions.

The cathode current collector foil is preferably an aluminium foil.

The anode current collector foil is preferably a copper foil, suitable in particular for lithium-sulfur (Li—S) battery or magnesium-sulfur (Mg—S) battery, or an aluminium foil, suitable in particular for sodium-sulfur (Na—S) battery.

The conductive adhesive layer, if present, may contain a conductive adhesive resin, preferably containing at least one polymer selected from the group comprising polyvinylidene fluoride, polyamide-imide, polyimide, poly-tetrafluoroethylene, styrene-butadiene rubber and conductive additives such as CNT, carbon black, graphene, rGO, graphite or amorphous carbon, such as Ketjen Black EC600JC or Black Pearl BP2000.

In a preferred embodiment, sulfur is present in the cathode in two forms, a so-called soft-case form and a so-called hard-case form. The soft-case form of sulfur is a form which can freely change its volume during charging (e.g., for Li—S batteries—decreasing volume from $Li_2S$ to $S_8$) and discharging (e.g., for Li—S batteries—increasing volume from $S_8$ to $Li_2S$). Soft-case sulfur is typically used in mixture with conductive additives, binders and pore-forming additives. The soft-case form of sulfur is preferably present in an amount of 50 to 90 wt. % of sulfur, relative to the total amount of sulfur. The hard-case form is sulfur infiltrated/encapsulated in a second porous host material which does not change volume together with the change of volume of the infiltrated sulfur during charging (for Li—S batteries—decreasing volume from $Li_2S$ to $S_8$) and discharging (for Li—S batteries—increasing volume from $S_8$ to $Li_2S$). Sulfur is usually infiltrated by melt-infiltration or solubilization method, or any other suitable method, and the sulfur expansion during charging and discharging is accommodated by internal porosity volume of the host material. These hard host materials may be, e.g., hollow carbon spheres. The hard-case form of sulfur is preferably present in an amount of 50 to 10 wt. %, preferably 40 to 10 wt. % of sulfur, relative to the total amount of sulfur. The hard-case form of sulfur is preferably predominantly (i.e., more than 50% of the total amount) present in the secondary cathode mass layer.

At least 20% of the sulfur present is preferably in the form of monoclinic sulfur. The rest of sulfur may be orthorhombic sulfur. Monoclinic sulfur has a higher molar volume than orthorhombic sulfur (16.38 $cm^3$/mol monoclinic vs. 15.49 $cm^3$/mol orthorhombic) and therefore the volume change with the formation of e.g. $Li_2S$ (for Li—S batteries) is smaller (27.68 $cm^3$/mol $Li_2S$). Preferably, 60 to 100 wt. % of the sulfur present in the cathode is monoclinic sulfur allotrope.

Conductive additives may include, e.g., carbon, $MnO_2$, metals, e.g. tin, silver, copper, etc. Pore-forming additives may include, e.g., sulfur, carbon, etc.

Alkali- and/or alkaline earth-ion-insertion, alloying or intercalating materials are materials in which alkali- and/or alkaline earth-ion reversible reactions occur, and such materials include, for example, for the alkali ion being $Li^+$: $LiFePO_4$/C, LTO, $Fe_3O_4$/fluorine-doped graphene-polymer composites, sulfur, sulfur-intercalated graphite oxide, sulfur-embedded porous carbon host, sulfur-graphene composite.

The binders, if present, are preferably conductive and may include, e.g., polyvinylidene fluoride, sodium carboxymethylcellulose, polyvinylpyrrolidone, polyethylene imide, polypyrrole, polyaniline, poly(3,4-ethylenedioxythiophene), polythiophene, polybutadiene.

In a preferred embodiment, binders include binary or ternary immiscible binder systems and are used in amounts from 3 to 20 wt. %. In the case of a binary system, a first solid conductive binder insoluble in a solvent used for the preparation of the electrode slurry and a second conductive binder soluble in the solvent used for the preparation of the electrode slurry are used. Examples may include polyvinylidene fluoride (PVdF) as the first binder, and sodium carboxymethylcellulose (NaCMC) as the second binder when mixture of water/ethanol/cyclohexanone is used for the preparation of the electrode slurry. In the case of a ternary system, a first solid conductive binder is capable of being coated onto the active mass by the solid state method, a second conductive binder partially soluble in the solvent used for the preparation of the electrode, and a third polymeric binder as a ionic selective polymer are used, for example poly(ethyleneimine) as a cationic polymer and/or poly(sodium 4-styrenesulfonate) as an anionic polyelectrolyte. As an example, the third polymeric binder is used to pre-coat carbon black in the form of an aqueous dispersion to modify its properties in such a way that attraction instead of repulsion occurs between carbon black additive and the main sulfur mass. When the ternary system is used, the total amount of the first and the second binder is 4 to 18 vol. %, and the amount of the third binder is 0.5 to 2.0 vol. %.

For example, in the binary system, the first binder (e.g., PVdF) is solubilized with soft-case sulfur and a conductive additive, and separately the second binder (NaCMC) is mixed (e.g., by solid state mechanofusion method) with hard case sulfur and conductive additive. Solvent used for dissolving the second binder (e.g., water/ethanol mixture/cyclohexanone) does not dissolve the first binder. Both mixtures are then mixed together to form slurry.

For example, in the ternary system, the first binder (e.g., PVdF) is solubilized (e.g., cyclopentanone or cyclohexanone) with soft-case sulfur and conductive additives, and separately the second binder (NaCMC) is milled (e.g., by solid state jet-mill method) with hard case sulfur and conductive additives. Solvent used for dissolving the second binder (e.g., water/ethanol mixture) does not dissolve the first binder. Both mixtures are then mixed together to form slurry. In a separate vial, a cationic or anionic polyelectrolyte solvent, preferably a cationic polyelectrolyte, is then added into aqueous dispersion of carbon black conductive additive.

Metals forming intermetallic alloys with alkali metals and/or alkaline earth metals, in particular with lithium, include Si, Al, Sn, Sb, Ge, Sn.

Electrically conductive additives may include, for example, carbon, $MnO_2$, metals, e.g. tin, silver, copper, antimon.

The primary anode mass layer preferably contains a dimensionally stable conductive porous host structure coated by a metal capable of forming intermetallic alloys with an alkali metal and/or an alkaline earth metal, such as lithium, and said coated porous host structure hosts metallic-decorated carbon nanoparticles and/or metallic-decorated graphene and/or carbon-decorated metallic nanoparticles, nanorods, nanotubes and/or metallic nanoparticles, nanotubes, whereas metals preferably include Sn, optionally in combination with Cu, Ag, Sb.

In a particularly preferred embodiment, the electrode materials (for both anode and cathode) such as sulfur, alkali metal and/or an alkaline earth metal, conductive additives, pore-forming additives, binders, graphene oxide, graphene, polymers may comprise combination of at least two different sizes of materials wherein the ratio of the sizes is from 5:1 to 18:1 and/or combination of at least two different shapes selected from zero-dimensional shape (particles), one-dimensional shapes (tubes, rods, fibers), two-dimensional shapes (platelets) and three-dimensional shapes (polyhedrons such as cubes, cuboids). The combination of at least two different shapes may include combinations 1D/2D, 0D/3D, 1D/3D, 1D/0D, 2D/0D, 2D/3D. Examples of combination of morphologies may include 0D sulfur nanoparticles and 1D sulfur nanorods, 1D carbon nanotubes (CNT) and 2D graphene, 500 nm sulfur nanoparticles and 50 nm sulfur nanoparticles, or 1D 500 nm sulfur nanofibers and 0D 50 nm sulfur nanoparticles.

Generally, the layer containing graphene oxide and/or reduced graphene oxide, heteroatom co-doped graphene, and polymer contains regions containing predominantly a mixture of polymer and graphene oxide and/or reduced graphene oxide, and regions containing predominantly heteroatom co-doped graphene.

The separator may be a spray deposited separator on the cathode, said separator preferably being soaked with liquid electrolyte, or it may be a separator inserted between the two electrodes. The separator inserted between the two electrodes may be a solid separator soaked with liquid electrolyte, a gel separator, or a liquid electrolyte. The spray-deposited separator on the cathode, i.e., forming a layer on the cathode, preferably has a thickness of 2 to 25 micrometers and may contain ceramics, polymer, pore forming precursors (such as sulfur) and solvent (such as dimethylsulfoxide, dimethylformamide, dimethylacetone, acetone).

In the battery according to the present invention, the electron conductive paths are provided by synergic interaction of four components—planar current conductive foil, conductive porous host structure, conductive additives and the graphene oxide/fluorine-doped graphene/fluoropolymer layer. The planar current conductive foil, the conductive additives and the graphene oxide/fluorine-doped graphene/fluoropolymer layer form electron conductive skeleton, in which the conductive additives mediate the interaction between the electrode active mass and conductive foam.

The structure of the electrodes of the present invention allows to manufacture cathode and anode active masses separately from current collector foils where the final assembly is done by gluing self-supporting electrode masses into current collector foils which contain a thin layer of conductive adhesive. This decreases manufacturing costs and provides a greater versatility of the production process and the final structures.

In another aspect of the present invention, a method for production of the cathode for the battery as described herein above is provided, comprising the following steps:
a) milling and homogenizing sulfur, conductive additives, binders and optionally pore-forming additives to form soft-case sulfur composite; and/or
b) milling and homogenizing sulfur and infiltrating it into the second porous host material, preferably by dip coating, spray coating or vacuum forced infiltration, to form hard-case sulfur composite, optionally adding conductive additives, binders and pore-forming additives,
c) depositing alkali metal- or alkaline earth metal-insertion, intercalation, alloying or conversion material on the top of a conductive porous host structure, preferably a structure with the working potential window under 4.2 V, preferably $LiFePO_4$ with a conductive porous host structure,
d) infiltrating the material prepared in step a) or b) or their mixture into the conductive porous host structure from step c),
e) attaching the resulting conductive porous host structure with embedded sulfur, alkali metal- or alkaline earth metal-insertion, intercalation, alloying or conversion material, and optionally conductive additives, binders, pore-forming additives, to a current collector foil by means of a conductive adhesive,
f) heating the resulting electrode precursor to the temperature of 95 to 135° C. for at least 5 minutes, and then maintaining it at 90 to 130° C. and subjecting it to calendering, then cooling it to 20 to 70° C. for at least 5 minutes to allow for re-crystallization and dissipation of internal material stress resulting from phase conversion,
g) optionally applying graphene oxide and/or reduced graphene oxide/polymer mixture and subjecting it to reduction procedure, preferably using pulse light flash drying and/or reducing procedure, thereby forming heteroatom co-doped graphene surface in the regions directly subjected to the reduction.

The hard-case sulfur is preferably prepared by dry pre-mixing of sulfur with the second porous host material, heating this pre-mixed material with additional sulfur (e.g., about 40 wt. % of sulfur, relative to the weight of the pre-mixed material) under inert atmosphere at 330 to 360° C., draining out non-encapsulated melted sulfur, cooling the mixture to room temperature and then optionally dry milling the resulting material with polymer binders and conductive additives (preferably, the conductive additives have surface area higher than 400 $m^2/g$). At the temperature of 330-360° C., the sulfur density is lower or equal to the density of $Li_2S$ (1.66 $g/cm^3$). The volume change of sulfur during cooling from 330-360° C. to room temperature is the same as its volume change at charging and discharging the battery, and thus the porous host structure does not break during charging and discharging the battery and the volume of this fraction of sulfur does not change. This contributes to dimensional stability of the cathode. The porous host material are preferably hollow carbon nano spheres.

The soft-case sulfur is preferably prepared by micronizing sulfur powder to the size of 25 nm to 5 micrometers, adding nanosized conductive additive, and adding polymeric binder, milling the mixture.

The monoclinic sulfur is preferably prepared in situ from orthorhombic sulfur, wherein the orthorhombic sulfur is in the form of 0D, 1D or 2D shapes having the dimensions of 25 nm to 5 micrometers, preferably about 400 nm, is subjected to treatment in non-oxidizing or reducing atmosphere at the temperature of at least 96° C.

A method for production of the anode for the battery as described herein above is provided, comprising the following steps:
milling and homogenizing conductive additives, binders and infiltrating the resulting mixture into a conductive porous host structure;
attaching the resulting conductive porous host structure to a current collector foil by means of a conductive adhesive,
optionally applying graphene oxide and/or reduced graphene oxide/polymer mixture and subjecting it to reduction procedure, preferably using pulse light flash drying and/or reducing procedure, thereby forming heteroatom co-doped graphene surface in the regions directly subjected to the reduction,
depositing alkali metal and/or alkaline earth metal into the porous host structure, which is preferably pre-coated by a metal capable of forming intermetallic alloys with the alkali metal and/or alkaline earth metal.

The manufacturing method of the battery may also include the battery pre-forming cycles which are made in the temperature range of +5 to −25° C.

The advantages of the alkali metal- and/or alkaline earth metal-sulfur battery of the invention include the following benefits:
- higher gravimetric/volumetric energy density (high areal active mass loading composites in 3D and 2D configuration).
- low cost material inputs—sulfur as a replacement of expensive Ni, Mn, Co metals.
- in preferred embodiments, the presence of two types of sulfur allotropes in the cathode significantly improves cycle ability of the battery cell.
- lower manufacturing costs because of elimination of classical slurry coating/drying/calendering process which significantly shortens the battery manufacturing process
- high areal mass loading electrodes will significantly improve the cost factor of cells as price €/kWh is in direct relation to areal capacity mAh/cm$^2$
- using supporting current collector grids/layers will improve the cathode active mass loading in mg/cm$^2$ and allow reaching acceptable cathode utilization levels at 2 C discharge
- using adhesive (glue) joining methods instead of slurry coatings for the electrode structures allows to delaminate and recycle the cells much faster and cleaner than the currently available mainly mechanical disintegration/shredding methods.
- higher percentage of active mass utilization means that less active material is needed to get desired cell parameters.

EXAMPLES OF CARRYING OUT THE INVENTION

Example 1 (Comparative Example): Standard Li—S Cell

Figure 1A:
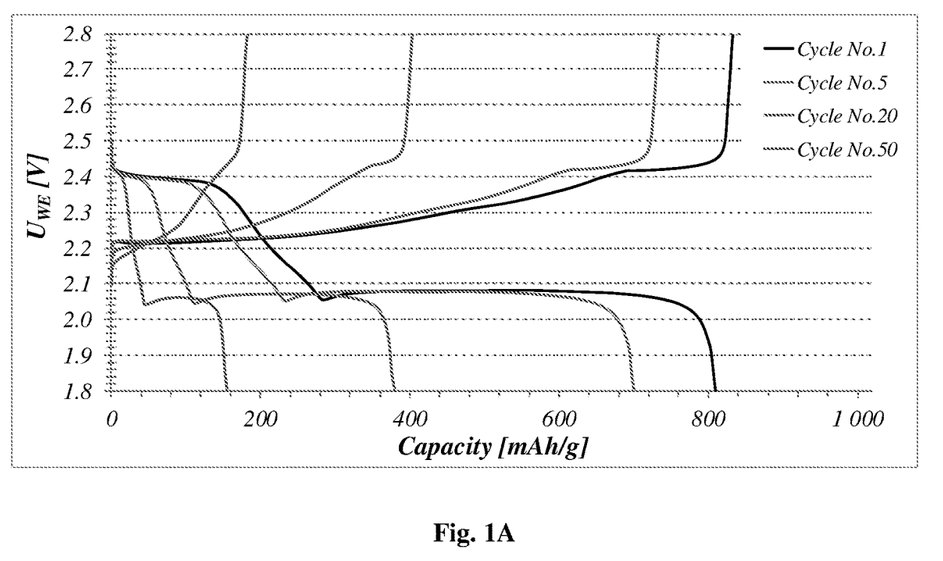
FIGS. 1A and 1B show the result of electrochemical characterization of a cell produced by the process of Example 1 by galvanostatic cycling (comparative example).
Figure 1B:
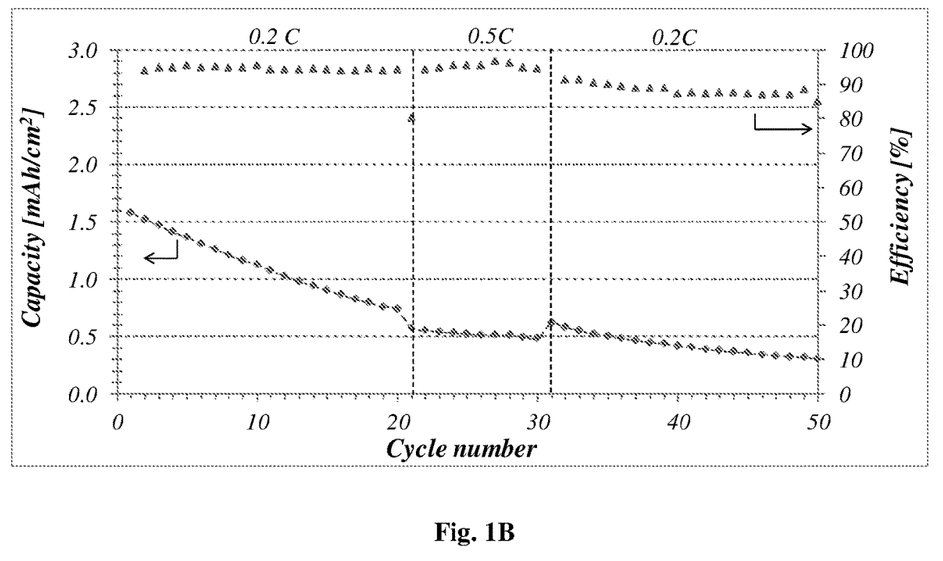
Figure 2A:
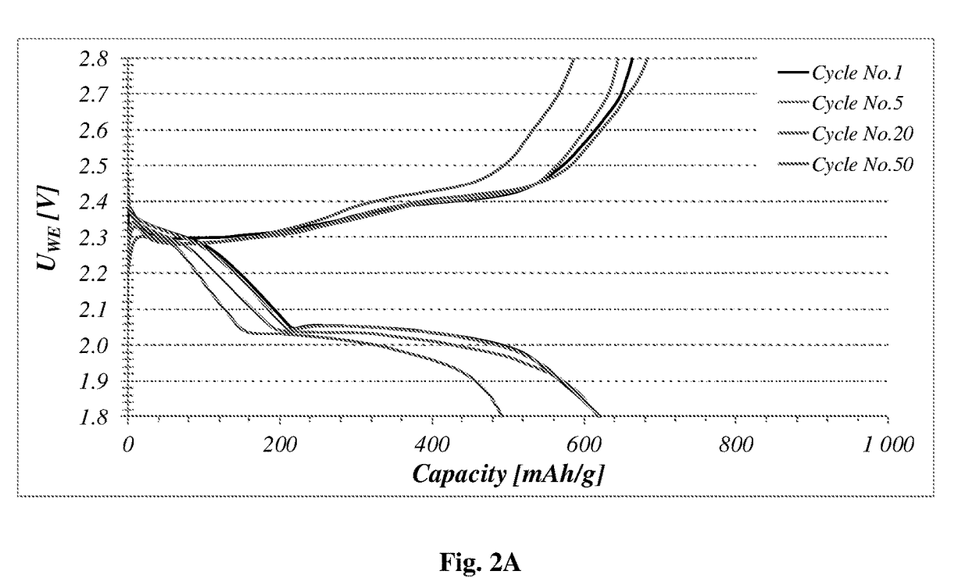
FIGS. 2A and 2B show the result of electrochemical characterization of a cell produced by the process of Example 2 by galvanostatic cycling.
Figure 2B:
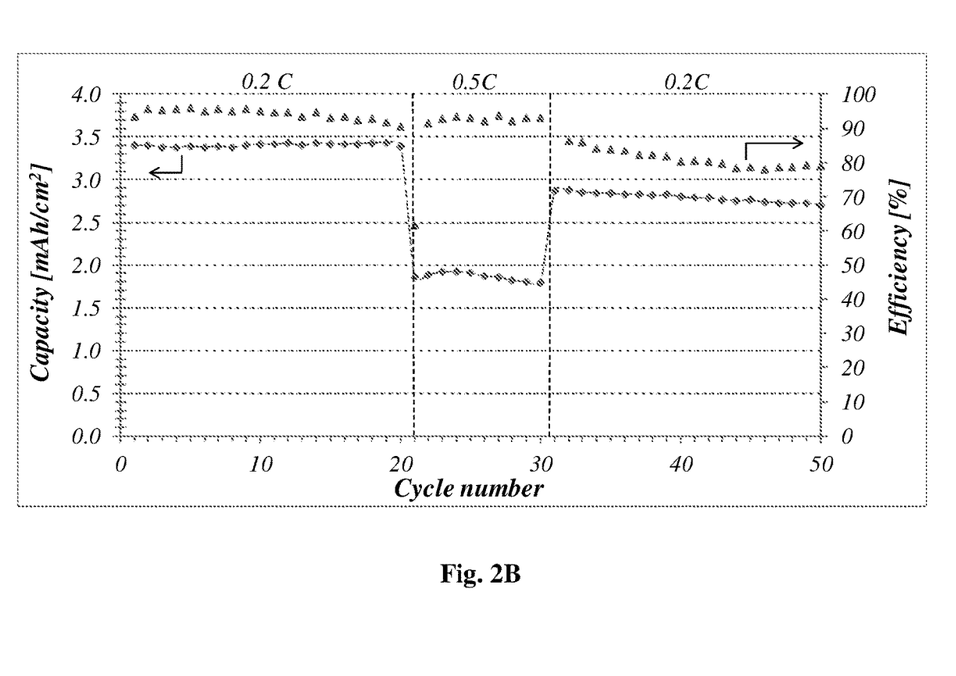
Figure 3A:
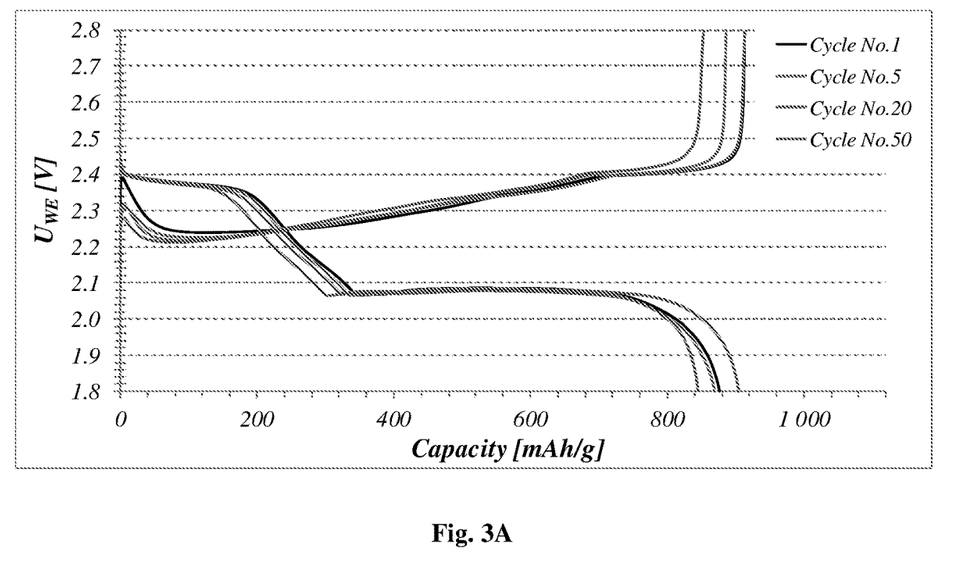
FIGS. 3A and 3B show the result of electrochemical characterization of a cell produced by the process of Example 3 by galvanostatic cycling.
Figure 3B:
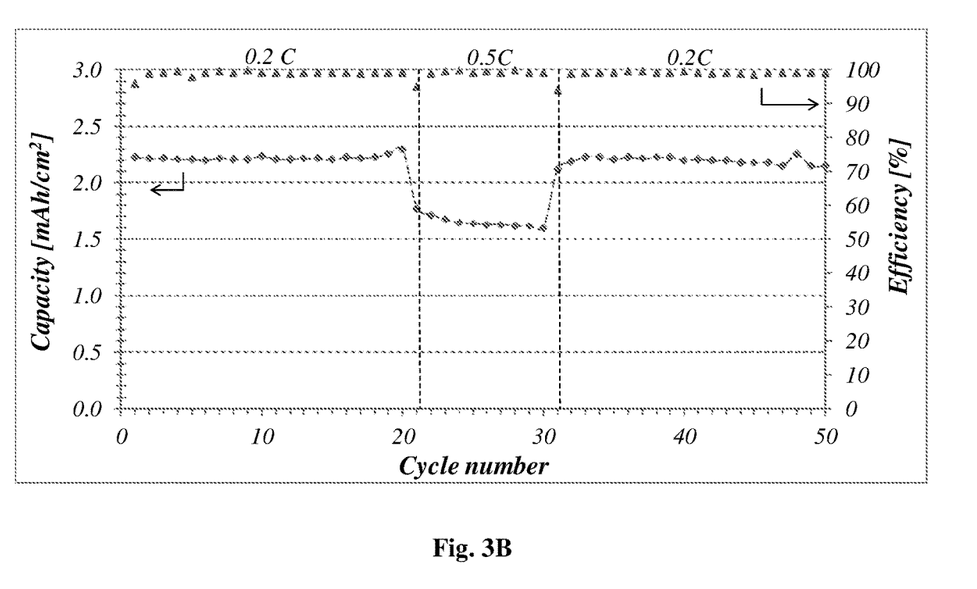
Figure 4:
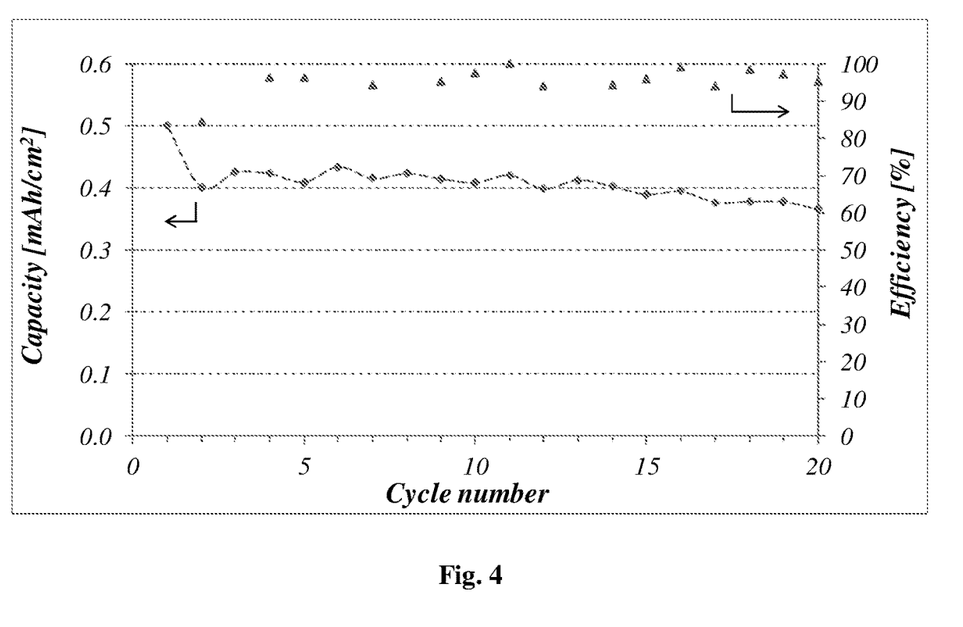
FIG. 4 shows the result of electrochemical characterization of a cell produced by the process of Example 4 by galvanostatic cycling.
Figure 5:
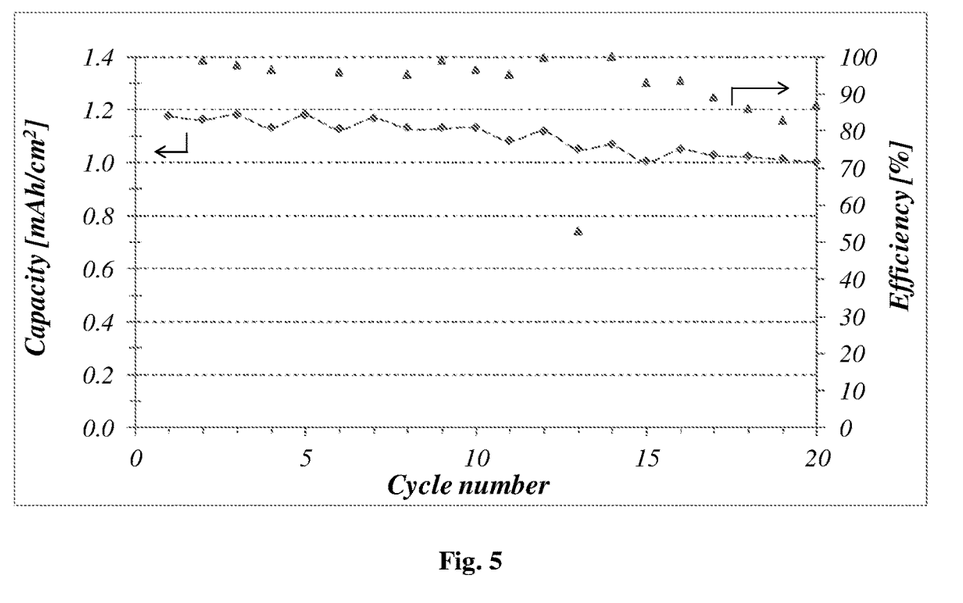
FIG. 5 shows the result of electrochemical characterization of a cell produced by the process of Example 5 by galvanostatic cycling.

Example 1 describes a basic LiS cell where cathode is applied in the form of slurry coating with standard NMP/PVDF binder/solvent combination and sulfur present as orthorhombic allotrope. FIGS. 1A and 1B describe gravimetric capacity as mAh/g of sulfur after 1, 5, 20 and 50 cycles (charge/discharge curves). FIGS. 2A and 2B describe area capacity of cathode as mAh/cm$^2$.

Experimental: The standard Li—S cathode was composed of 60% Sulphur (99.5%—Sigma Aldrich), 30% carbon Super P and 10% binder PVDF (Polyvinylidene difluoride—Sigma Aldrich). Sulphur was mixed with carbon Super P in a planetary mill (FRITSCH Pulverisette 7—premium line) in a ZrO$_2$ bowl with 10 mm diameter balls. The weight ratio of mixed material and the balls was 1:20. Milling was done in ethyl alcohol for 30 min at 500 rpm. The sample was dried in an oven (BMT venticell) for 12 hours at 30° C. after milling. Then it was again milled in a ball mill (FRITSCH PULVERISETTE 0) for 10 minutes. The next step was dissolving 0.04 g of PVDF in 2.6 ml of NMP (N-methylpyrrolidone—Sigma Aldrich) and 0.36 g of previously created mixture of S and Super P was added subsequently. This was mixed for 24 hours by a magnetic stirrer (HEIDOLPH MR Hei-Standard). The material was then deposited on an Al foil using a coating bar and dried for 12 hours at 50° C. An electrode of 18 mm diameter was cut out of the foil after drying. This electrode was then stored in vacuum at room temperature for 12 hours. After this, it was dried at 60° C. in argon atmosphere in a glove box (Jacomex). An electrochemical cell El-Cell ECC-STD was then assembled in the glove box. A pure lithium disk was used as an anode and 0.25 M LiNO$_3$+0.7 M LiTFSI in 1,2-dimethoxyethane (DME) and 1,3-dioxolane (DOL) 2:1 (v:v) soaked in glass fiber separator (Whatman glass microfiber) was used as electrolyte. The assembled cell was connected to the VMP3 (Bio-logic) potentiostat and electrochemically characterized by galvanostatic cycling.

Example 2: Li—S Cell Containing the Cathode of the Invention

Example 2 describes self supported cathode structure where sulfur is present as monoclinic allotrope as both soft case and hard case form and where electrode mass is made independently from current collector foil in such a way that 3D carbonized skeleton is infiltrated by electrode materials and, after drying, it is placed onto Al current foil which was prior primed with conductive adhesives.

Experimental: Melamine foam as self supporting structure: was sintered at 800° C. for 30 min in nitrogen atmosphere. After sintering, foam was pre-treated with hydrochloric acid, neutralized and washed with ultra-pure water and then cleaned in ultrasonic bath (water/ethanol) and dried for 10 h in air. Meanwhile, mixture of KJ Ketjenblack EC-600JD (AkzoNobel) carbon and gelatine is dissolved in water at 60° C. Electrode prepared by sintered melamine foam was then dip coated by this gelatine KJ black mixture and dried at 105° C. for 1 hour. After drying, carbonized coated melamine electrode was again sintered 820° C. for 60 min. Foam was then cut to thin slice approximately 500 μm thick and finally electrodes with diameter of 18 mm were cut out. This electrode was infiltrated by slurry and dried at 50° C. for 12 hours. The composition of slurry: 75.0% Sulphur (99.5%—Sigma Aldrich), 2% NaCMC, 7% BP, 1% CNT, 5% KJ black and 10% of the mixture of binders PVP (Polyvinylpyrrolidone—Sigma Aldrich) and PEI (Poly(ethyleneimine) hyperbranched—Sigma Aldrich) in the ratio of 5:1. The first step was milling the mixture of Sulphur, Black Pearl BP2000 carbon (CABOT corporation BLACK PEARLS®), CNT and NaCMC in a planetary mill (FRITSCH Pulverisette 7—premium line) in ethyl alcohol for 30 min at 500 rpm. The sample was dried in an oven (BMT venticell) for 12 hours at 30° C. after milling. Then it was again milled in a ball mill (FRITSCH Pulverisette 0) for 10 minutes. Mixing of the electrode paste was done in three stages in the planetary mill KJ black infiltrated by sulfur, BP carbon and PEI were mixed in a given ratio in the first step. The solvent was a mixture of isopropyl alcohol and water. It was mixed for 15 minutes. KJ black was infiltrated by sulfur before slurry preparation. Infiltration was done in heated glass tube connected to the heating stage with sulfur. Sulfur was heated to 360° C. for 5 hours and evaporated. Evaporated sulfur was then infiltrated into KJ black in the glass tube. A mixture of S+Black Pearls+CNT+NaCMC and PVP was then created in the planetary mill A mixture of isopropyl alcohol and water was used as a solvent again. Mixing time was 15 minutes. Both these mixtures were then mixed together in the planetary mill. It was mixed for 30 minutes. Conductive adhesive slurry was prepared using magnetic stirrer; it contained P84 (polyimide HP Polymer GmbH) binder and carbon Super P in NMP solvent. Mixing time was 24 hours. The weight ratio between P84 binder and Super P was (90:10). This slurry was then coated on Al foil by 24 μm coating bar and after drying at 50° C. for 12 hours. A self supporting cathode was placed on primed Al foil and secured on place by adhesive primed Al foil. The final electrode (ø15 mm) was cut out from this electrode composite. This electrode was then stored in vacuum at room temperature for 12 hours. After this, it was dried at 60° C. in argon atmosphere in the Jacomex glove box. The electrode was subsequently dried again at 105° C. for 12 hours in argon atmosphere. After that, an electrochemical cell El-Cell ECC-STD was assembled in the glove box. A pure lithium disk was used as an anode and 0.25M LiNO$_3$+0.7M LiTFSI in 1,2-dimethoxyethane (DME) and 1,3-dioxolane (DOL) 2:1 (v:v) soaked in glass fiber separator was used as electrolyte. The assembled cell was connected to the VMP3 (Bio-logic) potentiostat and electrochemically characterized by galvanostatic cycling.

Example 3: Li—S Cell Containing the Cathode and the Anode of the Invention

Example 3 describes self supported cathode structure presented in Example 2 in combination with a dimensionally stable anode where a 3D current collector was used, which serves as a matrix for a lithium layer.

Experimental: Preparation process of the self supporting cathode used in this example was described in Example 2. Dimensionally stable lithium metal anode was prepared from carbonized melamine foam as a template agent which was sintered and cleaned as in the example 2. Meanwhile a mixture of SuperP and gelatine was dissolved in 60° C. water and it was then dip coated into carbonized melamine foam (3× with 15 min forced air drying intervals between steps). Finally, the dip coated anode was dried at 105° C. for 1 hour and subsequently sintered again at 900° C. for 60 min. A layer of metallic tin was sputtered onto carbonized foam/Super P carbon black anode by magnetron PVD method from one side and non-conductive Al$_2$O$_3$ layer from opposite side. The dimensionally stable anode is made by placing foam with Sn coated side onto the adhesive prime-coated Cu current collector foil while the Al$_2$O$_3$ coated side is on top. The electrode was then cut to thin slices approximately 300 μm thick and finally electrodes with diameter of 18 mm are made. After drying at 50° C. for 12 hours, the electrode was inserted into the electrochemical test cell El-Cell ECC-STD inside the glove box. A pure lithium disk was used as a counter electrode and a mixture of 1M LiPF$_6$ in ethylene carbonate (EC) and dimethyl carbonate (DMC) 1:1 (v:v) soaked in glass fiber separator was used as electrolyte. Lithium was subsequently deposited on the tin layer on the surface of porous electrode at the potential of 0 V. The cell was then opened in the glove box and the lithium coated porous electrode was inserted into another electrochemical test cell El-Cell ECC-STD. The self supported cathode structure presented in example 2 was used as a cathode and a mixture of 0.25M LiNO$_3$+0.7M LiTFSI in 1,2-dimethoxyethane (DME) and 1,3-dioxolane (DOL) 2:1 (v:v) soaked in a glass fiber separator was used as electrolyte. The assembled cell was connected to the VMP3 (Bio-logic) potentiostat and electrochemically characterized by galvanostatic cycling.

Example 4: Mg—S Cell Containing the Cathode of the Invention

Example 4 describes self supported cathode structure where sulfur is present as monoclinic allotrope as both soft case and hard case form and where electrode mass is made independently from current collector foil in a way that 3D carbonized skeleton is infiltrated by electrode materials and after drying it is placed onto Al current foil which was prior primed with conductive adhesives.

Experimental: Melamine foam as self supporting structure was sintered at 800° C. for 30 min in nitrogen atmosphere. After sintering, foam was pre-treated with hydrochloric acid, neutralized and washed with ultra-pure water and then cleaned and in an ultrasonic bath (water/ethanol) and dried for 10 h in air. Meanwhile, a mixture of KJ Ketjenblack EC-600JD (AkzoNobel) carbon and gelatine was dissolved in 60° C. water. The electrode prepared by sintered melamine foam was then dip coated by this gelatine KJ black mixture and dried at 105° C. for 1 hour. After drying, the carbonized coated melamine electrode was again sintered at 820° C. for 60 min. Foam was then cut to thin slices approximately 500 μm thick and finally electrodes with diameter 18 mm were cut out. This electrode was infiltrated by slurry and dried at 50° C. for 12 hours. The composition of slurry: 75.0% Sulphur (99.5%—Sigma Aldrich), 2% NaCMC, 7% BP, 1% CNT, 5% KJ black and 10% mixture of binders PVP (Polyvinylpyrrolidone—Sigma Aldrich) and PEI (Poly(ethyleneimine)—Sigma Aldrich) in the ratio of 5:1. The first step was milling the mixture of Sulphur, Black Pearl BP2000 carbon (CABOT corporation BLACK PEARLS®), CNT and NaCMC in a planetary mill (FRITSCH Pulverisette 7—premium line) in ethyl alcohol for 30 min at 500 rpm. The sample was dried in an oven (BMT venticell) for 12 hours at 30° C. after milling. Then it was again milled in a ball mill (FRITSCH Pulverisette 0) for 10 minutes. Mixing of the electrode paste was done in three stages in the planetary mill KJ black infiltrated by sulfur, BP carbon and PEI were mixed in a given ratio in the first step. The solvent was a mixture of isopropyl alcohol and water. It was mixed for 15 minutes. KJ black was infiltrated by sulfur before slurry preparation. Infiltration was done in the heated glass tube connected to heating stage with sulfur. Sulfur was heated to 360° C. for 5 hours and evaporated. Evaporated sulfur was then infiltrated into KJ black in the glass tube. A mixture of S+Black Pearls+CNT+NaCMC and PVP was then created in the planetary mill A mixture of isopropyl alcohol and water was used as a solvent again. Mixing time was 15 minutes. Both these mixtures were then mixed together in the planetary mill. It was mixed for 30 minutes. Conductive adhesive slurry was prepared in the magnetic stirrer. It contained P84 (polyimide HP Polymer GmbH) binder and carbon Super P in NMP solvent. Mixing time was 24 hours. Weight ratio between P84 binder and Super P was (90:10). This slurry was then coated on Al foil by 24 μm coating bar and after drying at 50° C. for 12 hours, a self supporting cathode was placed on primed foil Al foil and secured on place by adhesive primed Al foil. The final 015 mm electrode was cut out from this electrode composite. This electrode was then stored in vacuum at room temperature for 12 hours. After this, it was dried at 60° C. in argon atmosphere in the Jacomex glove box. The electrode was subsequently dried again at 105° C. for 12 hours in the argon atmosphere. After that, an electrochemical cell El-Cell ECC-STD was assembled in the glove box. A Mg-carbon composite pellet containing magnesium powder and Carbon black (80:20) weight ratio was used as an anode and 0.25M Mg(HMDS)$_2$ (magnesium bis(hexamethyldisilazide))+ 0.75M LiTFSI (lithium bis(trifluoromethane)sulfonimide) salt in DEGDME (diethylene glycol dimethyl ether) soaked in glass fiber separator was used as electrolyte. The assembled cell was connected to the VMP3 (Bio-logic) potentiostat and electrochemically characterized by galvanostatic cycling.

Example 5: Mg—S Cell Containing the Cathode and the Anode of the Invention

Example 5 describes self-supported cathode structure presented in Example 4 in combination with a dimensionally stable anode where its 3D porous and conductive structure serves as a matrix for an efficient magnesium plating-stripping process without volume change.

Experimental: Preparation process of the self-supporting cathode used in this example was described in Example 2. The dimensionally stable magnesium metal self-supporting anode was prepared from carbonized melamine foam as matrix structure which was sintered and cleaned as in example 2. Meanwhile a mixture of SuperP and gelatine was dissolved in 60° C. water and carbonized melamine foam was then dip coated into this mixture (3× with 15 min forced air drying intervals between the steps). Finally, the dip coated anode was dried at 105° C. for 1 hour and subsequently sintered again at 900° C. for 60 min. A layer of metallic tin was sputtered onto carbonized foam/Super P carbon black anode by magnetron PVD. A dimensionally stable anode is made by placing foam with the Sn coated side onto adhesive prime-coated Cu current collector foil. The electrode was then cut to thin slices approximately 300 μm thick and finally electrodes with the diameter of 18 mm were made. After drying at 50° C. for 12 hours, the electrode was inserted into the electrochemical test cell El-Cell ECC-STD inside the glove box. A pure magnesium disk was placed onto the top of dimensionally stable anode and 0.25M Mg(HMDS)$_2$ (magnesium bis(hexamethyldisilazide))+ 0.75M LiTFSI (lithium bis(trifluoromethane)sulfonimide) salt in DEGDME (diethylene glycol dimethyl ether) soaked in the glass fiber separator was used as electrolyte. The cell is then fully discharged—activated at low currents, preferably C/20, when the magnesium chip is fully stripped and divalent Mg$^{2+}$ cations subsequently react with sulfur cathode. During the first re-charging cycle, magnesium was deposited inside the tin coated carbonized porous electrode at the potential of −1.2 V vs Mg with limited areal capacity leaving 15% porosity on anode after fully stripping the Mg chip. The assembled cell was connected to the VMP3 (Bio-logic) potentiostat and electrochemically characterized by galvanostatic cycling.

The invention claimed is:

1. An alkali- and/or alkaline earth-ion-sulfur battery comprising:
   at least one cathode containing:
      a cathode current collector foil;
      a primary cathode mass layer, containing a conductive dimensionally stable porous host structure, sulfur as an active material, wherein at least 20% of the sulfur present is monoclinic sulfur allotrope;
      a secondary cathode mass layer, containing sulfur and alkali-ion- and/or alkaline earth-ion-intercalating material;
   wherein sulfur is present in the cathode in as a mixture of the following forms:
      soft-case form configured to reversibly change its volume during charging and discharging, in the amount of 50 to 90 wt. % of sulfur, relative to the total amount of sulfur;
      hard-case form comprising sulfur infiltrated into a second porous host material wherein the host material is configured to maintain its external dimensions together regardless of the change of volume of the sulfur during charging and discharging, in the amount of 50 to 10 wt. % of sulfur, relative to the total amount of sulfur;
   at least one anode and at least one separator.

2. The alkali- and/or alkaline earth-ion-sulfur battery according to claim 1, wherein the at least one anode contains
   an anode current collector foil;
   a primary anode mass layer, containing a conductive dimensionally stable porous host structure, a metal capable of forming intermetallic alloys with an alkali metal and/or an alkaline earth metal;
   an alkali metal and/or an alkaline earth metal.

3. The battery according to claim 1, wherein the dimensionally stable conductive porous host structure is selected from carbon foam, flexible porous carbon foam, carbonized organic and/or polymeric foam, electroless plated organic and/or polymeric foam, graphene coated carbon foam; MnO$_2$ foam, and MnO$_2$-coated carbon foam.

4. The battery according to claim 1, wherein the conductive porous host structure is self-supporting.

5. The battery according to claim 1, wherein the separator contains about up to 10 wt. % of sulfur.

6. The battery according to claim 1, wherein 60 to 100 wt. % of the sulfur present in the cathode is monoclinic sulfur allotrope.

7. The battery according to claim 1, wherein binders are further present in the primary cathode mass layer, said binders including binary or ternary immiscible binder systems which are used in amounts from 3 to 20 wt. %, relative to the amount of the primary mass layer, wherein
   in the binary system, a first solid conductive binder insoluble in a solvent used for the preparation of the electrode and a second conductive binder soluble in the solvent used for the preparation of the electrode are used;
   in the ternary system, a first solid conductive binder insoluble in a solvent used for the preparation of the electrode, a second conductive binder soluble in the solvent used for the preparation of the electrode, and a third polymeric binder as a surfactant are used.

8. The battery according to claim 2, wherein the primary anode mass layer contains a conductive porous host structure coated by a metal capable of forming intermetallic alloys with alkali metal and/or alkaline earth metal, and said coated porous host structure hosts metallic-decorated carbon nanoparticles and/or metallic-decorated graphene and/or carbon-decorated metallic nanoparticles, nanorods, nanotubes and/or metallic nanoparticles, nanorods, nanotubes.

9. The battery according to claim 8, wherein the metal is Sn or a combination of Sn with Cu, Ag, Sb.

10. The battery according to claim 1, wherein the electrode materials selected from sulfur, alkali metal, alkaline earth metal, conductive additives, pore-forming additives, binders, graphene oxide, graphene, polymers, comprise a combination of at least two different sizes of materials wherein the ratio of the sizes is from 3:1 to 18:1 and/or a combination of at least two different shapes selected from zero-dimensional shape, one-dimensional shapes, two-dimensional shapes and three-dimensional shapes.

11. The alkali- and/or alkaline earth-ion-sulfur battery according to claim 1, wherein the at least one cathode further contains:
   a conductive adhesive interlayer placed between the cathode current collector foil and a primary cathode mass layer; and/or
   a layer containing graphene oxide and/or reduced graphene oxide, heteroatom Group VIIa and/or Group Va elements co-doped graphene, and a Group VIIa and/or Group Va heteroatom-containing polymer.

12. The battery according to claim 1, wherein the separator is selected from
   a spray deposited separator on the cathode,
   a spray deposited separator on the cathode soaked with liquid electrolyte and/or ionic liquid,
   a spray deposited separator on the cathode containing sulfur as pore forming additive, and
   a separator inserted between the two electrodes, which is selected from a solid separator soaked with liquid electrolyte and/or ionic liquid, a gel separator, a liquid electrolyte, ionic liquid, and a combination thereof.

13. A method for production of the cathode for the battery according to claim 1, comprising the following steps:
   a) milling and homogenizing sulfur to form a soft-case sulfur composite; and
   b) milling and homogenizing sulfur and infiltrating it into a second porous host material to form hard-case sulfur composite,
   c) depositing alkali- and/or alkaline earth-ion-intercalating material on the top of a conductive porous host structure,
   d) infiltrating the material prepared in steps a) and b) into the dimensionally stable conductive porous host structure from step c),
   e) attaching the resulting dimensionally stable conductive porous host structure with embedded sulfur, alkali- and/or alkaline earth-ion-intercalating material to a current collector foil, and
   f) heating the resulting electrode precursor to the temperature from 95 to 135° C. for at least 5 minutes, and then maintaining it at 90 to 130° C. and subjecting it to calendering, then cooling it to 20 to 70° C. for at least 5 minutes to allow for re-crystallization and dissipation of internal material stress resulting from phase conversion.

14. The method according to claim 13, wherein the hard-case sulfur is prepared by dry pre-mixing of sulfur with the second porous host material, heating this pre-mixed material with additional sulfur under inert atmosphere at 300 to 380° C., draining out non-encapsulated melted sulfur, cooling the mixture to room temperature and then optionally dry milling and/or impact, e.g. jet, milling the resulting material with polymer binders and conductive additives.

15. The battery according to claim 11, wherein the layer containing graphene oxide and/or reduced graphene oxide, heteroatom Group VIIa and/or Group Va elements co-doped graphene, and a Group VIIa and/or Group Va heteroatom-containing polymer contains regions containing more than 50% of a mixture of graphene oxide and/or reduced graphene oxide and polymer, and regions containing more than 50% of heteroatom co-doped graphene.

16. The alkali- and/or alkaline earth-ion-sulfur battery according to claim 1, wherein the primary cathode mass layer further contains conductive additives, binders and pore-forming additives.

17. The alkali- and/or alkaline earth-ion-sulfur battery according to claim 2, wherein the at least one anode further contains
   a conductive adhesive interlayer placed between the anode current collector foil and a primary anode mass layer; and/or
   a secondary anode mass layer, containing graphene oxide and/or reduced graphene oxide, heteroatom Group VIa elements co-doped graphene, and a polymer.

18. The alkali- and/or alkaline earth-ion-sulfur battery according to claim 2, wherein the primary anode mass layer further contains conductive additives, binders and pore-forming additives.

19. The alkali- and/or alkaline earth-ion-sulfur battery according to claim 2, wherein the alkali metal and/or alkaline earth metal are in the form of foil or powder.

20. The method according to claim 13, which further comprises applying graphene oxide and/or reduced graphene oxide/polymer mixture and subjecting it to reduction procedure, forming heteroatom co-doped graphene surface in the regions directly subjected to the reduction.

21. The method according to claim 13, wherein step a) comprises milling and homogenizing sulfur, and conductive additives and/or binders and/or pore-forming additives to form a soft-case sulfur composite.

22. The method according to claim 13, wherein step b) comprises milling and homogenizing sulfur and infiltrating it into a second porous host material and adding conductive additives, binders and pore-forming additives, to form hard-case sulfur composite.

23. The method according to claim 13, wherein in step b) the infiltrating of sulfur into a second porous host material is made by dip coating, spray coating or vacuum forced infiltration.

24. The method according to claim 13, wherein in step c) the conductive porous host structure has a working potential window under 4.2 V.

* * * * *